United States Patent [19]

Young

[11] Patent Number: 5,560,268

[45] Date of Patent: Oct. 1, 1996

[54] DIFFERENTIAL MECHANISM WITH LOCKABLE ROTATABLE CAM MEMBERS

[75] Inventor: Alastair J. Young, Kenilworth, United Kingdom

[73] Assignee: Automotive Products, plc, Leamington Spa, England

[21] Appl. No.: 360,749

[22] PCT Filed: May 6, 1994

[86] PCT No.: PCT/GB94/00987

§ 371 Date: Dec. 22, 1994

§ 102(e) Date: Dec. 22, 1994

[87] PCT Pub. No.: WO94/27065

PCT Pub. Date: Nov. 24, 1994

[30] Foreign Application Priority Data

May 7, 1993 [GB] United Kingdom .................. 9309412

[51] Int. Cl.⁶ .................................................. F16H 48/14
[52] U.S. Cl. .................................................. 74/650
[58] Field of Search .................................... 74/650

[56] References Cited

U.S. PATENT DOCUMENTS 5,062,320  11/1991  Parsons et al. ........................ 74/650

FOREIGN PATENT DOCUMENTS 0256746  2/1988  European Pat. Off. .
0432673  7/1935  United Kingdom .

Primary Examiner—Charles A. Marmor
Assistant Examiner—Sherry Estremsky
Attorney, Agent, or Firm—Paul E. Milliken; Lee A. Germain

[57] ABSTRACT

A differential mechanism having two output cam members rotatable about an axis (X—X), each cam member having a single annular frustoconical cam surface thereon of undulating form comprising pairs of mutually inclined surfaces and a plurality of cam followers having end surfaces engaging the cam surfaces of the output cam members. Relative contra rotation of the output cam members causes the cam followers to slide axially and an input member engages the followers which are slidably supported by the input member and moves the followers circumferentially relative to the output cam members. A locking means is also provided for locking the output cam members and/or the input member against relative rotation to lock up the differential mechanism.

5 Claims, 4 Drawing Sheets

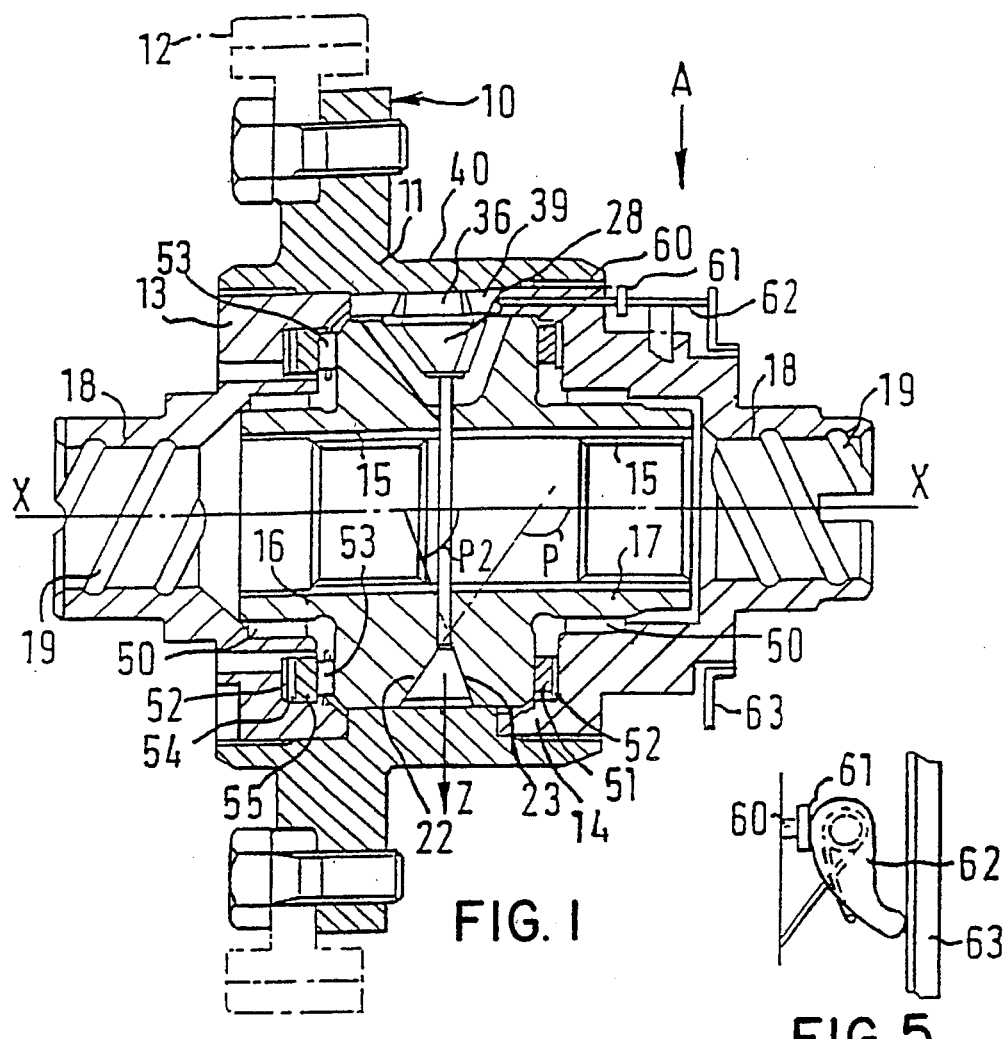
FIG. 1
FIG. 5
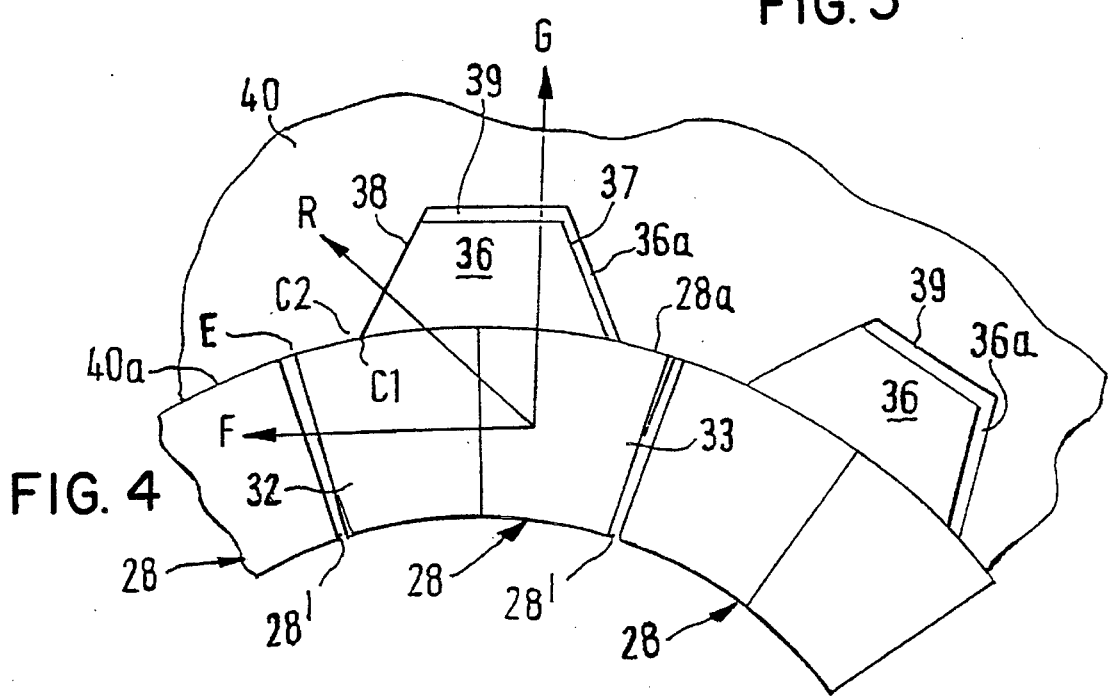
FIG. 4

DIFFERENTIAL MECHANISM WITH LOCKABLE ROTATABLE CAM MEMBERS

FIELD OF THE INVENTION

This invention relates to a differential mechanism particularly but not exclusively for use in motor vehicles.

BACKGROUND OF THE INVENTION

Differential mechanisms commonly used on vehicles are of the sun and planet gear type and have a well known disadvantage that when one wheel is on a slippery surface such as mud or ice and the other wheel is on a firm surface capable of providing traction, the first wheel will simply spin as it receives all the available power transmitted to the differential.

Limited slip differential mechanisms have been proposed in an attempt to overcome this problem which restrict the extent to which one wheel can spin relative to the other but such differentials are more complex and, therefore, most costly to produce.

In European patent application EP-A-0326289 there is proposed an alternative differential mechanism comprising two output cam members rotatable about an axis, each said member having a single frustoconical cam surface thereon of undulating from comprising pairs of mutually inclined surfaces, and a plurality of cam followers having end surfaces engaging the cam surfaces of the output cam members, the arrangement being such that relative contra rotation of said output cam members causes the cam followers to slide axially, and an input member engaging the followers which are slidably supported by the input member and moving the followers circumferentially relative to the output cam members.

Such a differential will hereinafter be called a differential of the type referred to.

OBJECTS OF THE INVENTIONS

It is an object of the present invention to provide a differential of the type referred to which mitigates the above problems.

According to the present invention there is provided a differential of the type referred to in which locking means is provided for locking any two of the said members against relative rotation.

Preferably the input member comprises an input housing and the output cam members are rotatably mounted within the housing, and conveniently the locking means operates between the induct member and at least one of the two output cam members.

In one arrangement the locking means is mounted on the input member for engagement with a cam follower to prevent axial movement of the cam follower. In another arrangement the locking means is operatively connected with an output cam member and is engageable with the input member.

DESCRIPTION OF THE DRAWINGS

Differential mechanisms in accordance with the invention will now be described by way of example with reference to the accompanying drawing in which:

FIG. 1 is a cross section through a differential mechanism in accordance with the invention taken through output cam members, FIG. 5 is a view on arrow 'A' of FIG. 1 showing the locking means operating mechanism.

DESCRIPTION OF THE PREFERRED EMBODIMENTS

Figure 2:
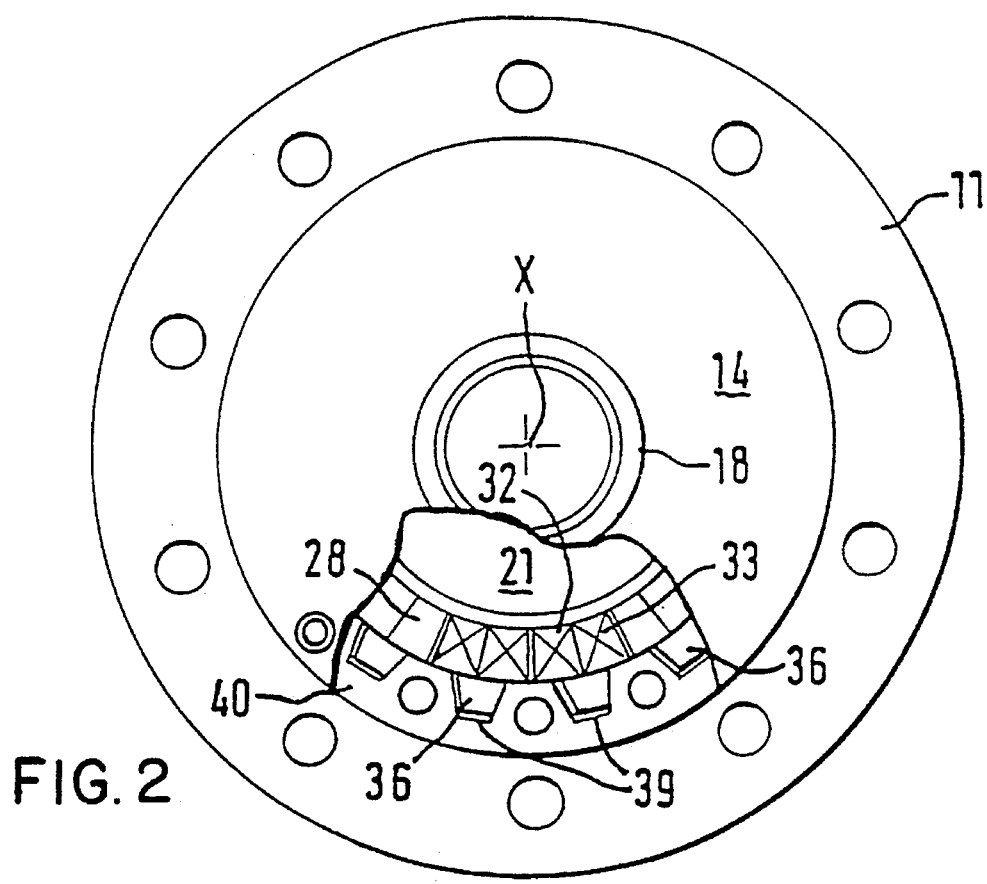
FIG. 2 is an end view of the differential of FIG. 1 shown partly broken away.
Figure 3:
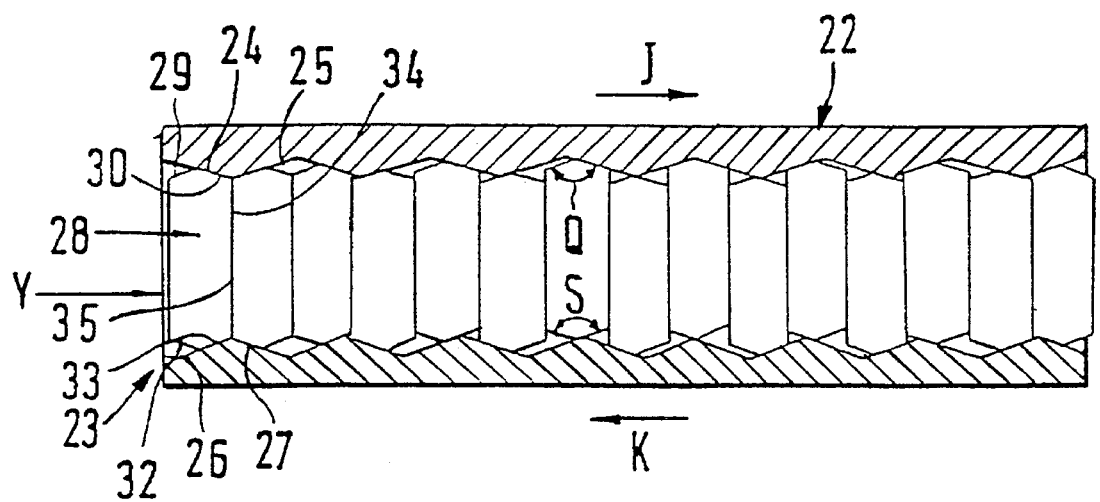
FIG. 3 is a development of cam surfaces with cam followers shown in positions there between, FIG. 4 is a diagrammatic end view of a follower.
Figure 6:
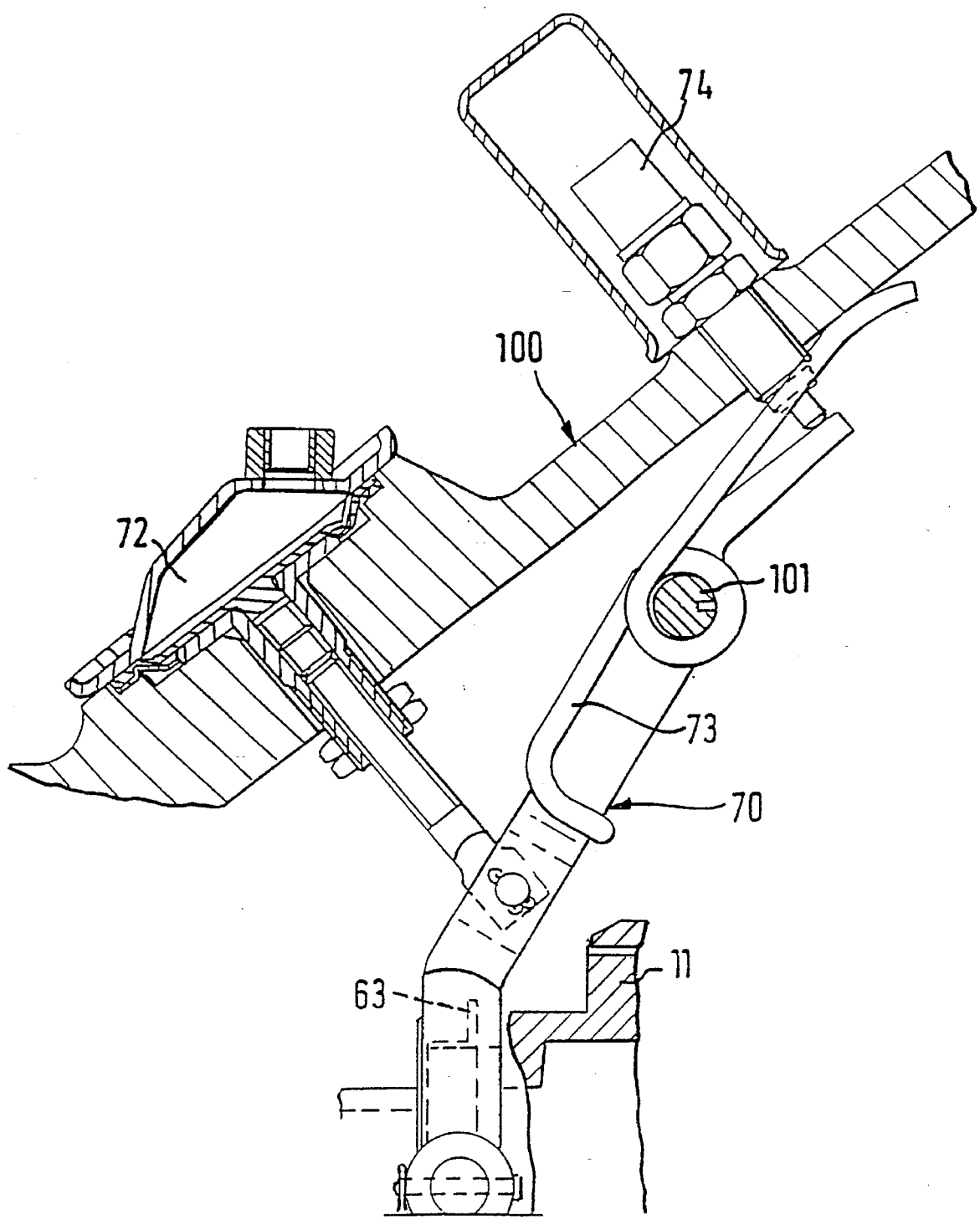
FIG. 6 is showing one means of operating the mechanism.
Figure 7:
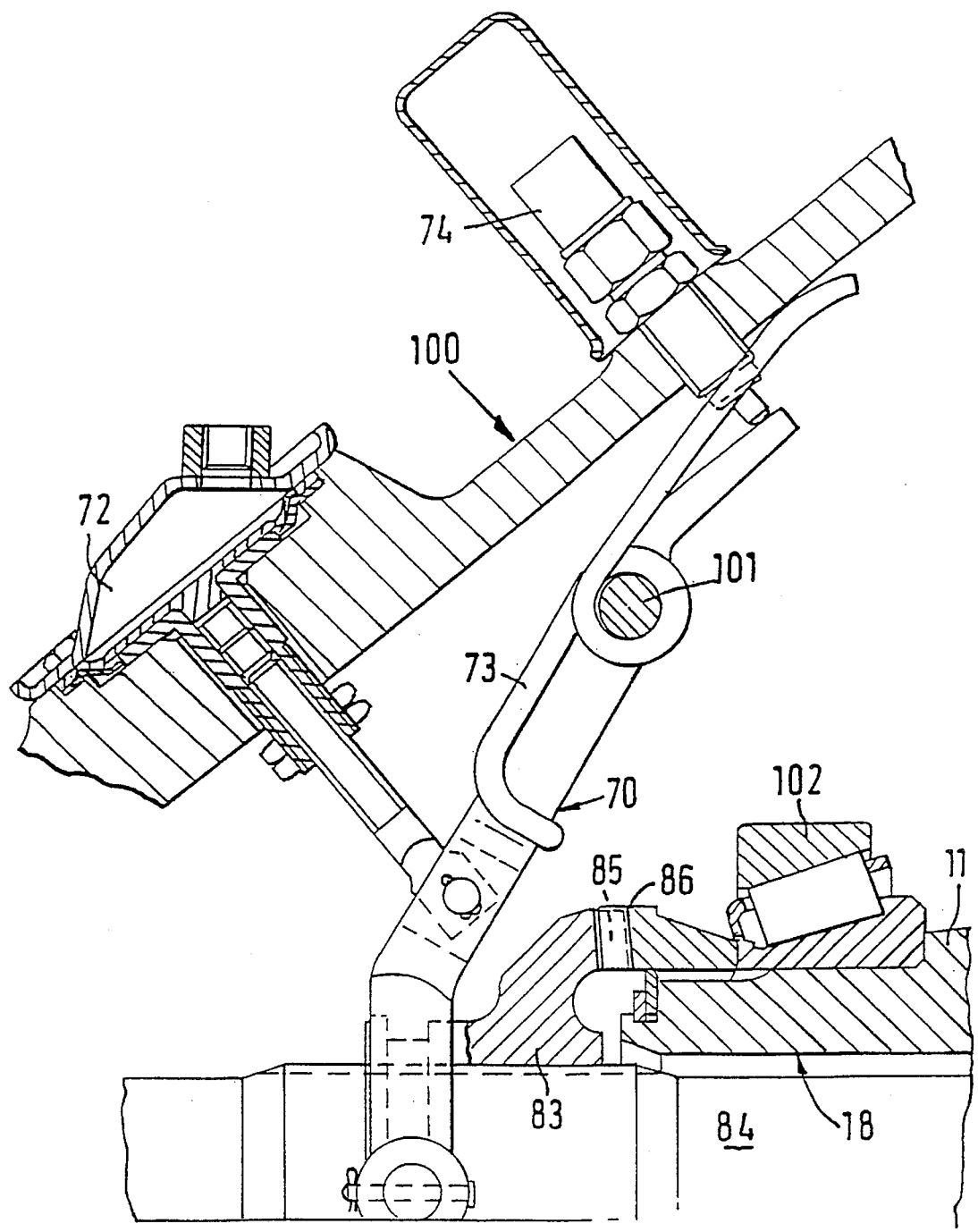
FIG. 7 shows an alternative locking means which engages the external surface of the input housing.

In FIGS. 1 to 3 the differential 10 is mounted in a partially oil filled surrounding casing 100 (see FIG. 6) by bearings 102 (shown in FIG. 7). The differential 10 comprises a housing 11 having a gear 12 on its external surface which receives drive from a pinion (not shown) in known manner. The gear 12 is drivably connected to end walls 13, 14 which may be formed integrally of the housing 11 or may be formed separately and held in the housing 11 by any suitable means such as screwing into the housing 11 and then locking in position, peening, welding and circumferentially spaced bolts.

Two output cam members 16, 17 have splines 15 at the centre thereof in use, to drive output shafts (not shown) extending through bores 18 in the end walls 13, 14. The bores 18 each have a helical oil feed groove 19 on the inner surface thereof in use to feed lubrication into the differential. The output members 16, 17 are rotatable in bearings 50 about an axis X relative to the housing 11. The output members 16, 17 each have a respective undulating cam surface 22, 23 thereon Which comprises a frustoconical undulating surface. The cam surface 22 comprises an annular zigzag surface shown in detail in FIG. 3 made up from seven pairs of mutually inclined helical surfaces 24, 25. The cam surface 23 also comprises an annular zigzag surface apparent from FIG. 3 but is made up from eight pairs of mutually inclined helical surfaces 26, 27. As shown in FIG. 1 the undulating cam surface 22 is inclined at an angle P to the axis X—X and the cam surface 23 is inclined at angle P2 to the axis X—X, whereby each cam surface converges towards the other.

Fifteen cam followers 28 are positioned between the cam surfaces 22, 23. Each cam follower is of strut-like elongate form and comprises two sets of mutually inclined end surfaces 29,30,32 and 33 which terminate at relatively lunger side surfaces 34,35. The angle of inclination Q between the end surfaces 29,30 corresponds to the angle of inclination between the cam surfaces 24,25 and the angle of inclination S between the end surfaces 32,33 corresponds to the angle of inclination between the cam surfaces 26,27. The end surfaces 29,30 are also inclined at angle P and the end surfaces 32, 33 are inclined at angle P2 as apparent from FIG. 1. When viewed from the end each cam follower is arcuate which enables the followers to be assembled together as viewed in FIG. 2. Each cam follower has an arcuate embrace of substantially 360/nf degrees where nf is the number of cam followers. However, if desired the arcuate embrace may be less to leave clearance spaces 28 (see FIG. 4) between the followers.

Each cam follower includes an elongate drive dog 36 having mutually inclined side surfaces 37,38 (FIG. 4). The drive dogs 36 locate with slight clearance 36a in complementary shaped grooves 39 formed in the inner periphery of a cylindrical drive input element 40 formed on input housing 11. The clearance 36a is just sufficient to ensure that the arcuate outer periphery (indicated at 28a) of each follower 28 can abut the inner peripheral surface (40a) of the drive input element 40. The grooves 39 provide support for the followers 28 at least adjacent their axial ends and preferably, as shown, for substantially their entire length.

As apparent from FIGS. 2 and 3 the assembly of the cam followers 28 is preferably such as to place the side surfaces 34,35 of adjacent followers so that they interengage or lie closely adjacent. In that way maximum use is made of the available circumferential space for the cam followers, the followers together forming a substantially continuous and compact annular array as viewed in FIG. 2.

When drive input is applied through drive input housing 11, and assuming that a vehicle having the differential is being driven in a straight line, the cam followers apply a load to the surfaces of the cam surfaces 22,23 so as to rotate the output cam members 16,17 at equal speeds. As apparent from FIG. 3, with a driving load applied in direction Y the cam follower 28 on the extreme left has its end surfaces 30,33 in driving engagement with surfaces 24,26 and alternate followers are similarly in driving engagement with the cam surfaces 22,23. However, intermediate cam followers have their surfaces in non-driving engagement with surfaces 25,27.

The driving force applied by the followers 28 to the inclined surfaces 24,26 produces a reaction force F as illustrated in FIG. 4. The inclination of the end surfaces of the cam followers at angle P and P2 causes the application of forces to the cam followers, which are shown only for cam surface 22 having the angle P. The application of force F to follower 28 creates an outward force G thereby producing a resultant force R which passes radially outboard of edge E preferably approximately through or adjacent a corner C1 between the drive dog 36 and an adjacent outer peripheral part 28a of the follower 28. In that way the loading on the cam follower tends to wedge it firmly against a corner C2 or the drive input element 40 in such a way that tipping of the follower about its edge E is avoided.

The differential effect can best be appreciated considering the driving element 40 as being stationary and by applying contra rotary movement to the cams 16,17 and the drive input element 40 are all given an additional rotational movement in direction of arrow J, it will be appreciated that the cams 16 and 17 will be rotating respectively faster and slower than element 40. The difference in speeds between the two cams 16,17 and the drive input element 40 will result from the different number of cam surfaces on the cams. As there is a considerable amount of friction between the followers and the cams, torque will be transmitted to one cam even when the other is drivably connected to a wheel spinning on a slippery surface which is highly advantageous over conventional differential systems. The moving of one wheel faster than the other will result in a reduction in net torque applied to that wheel through the associated cam due to the load applied by the axially moving cam followers to which input torque is applied. There will be, in that case, an increase in the net torque applied at the other cam and the ratio between the net torques will be dependent upon the values of the angles Q,S. The greater the angles, the greater will be the friction at the cam surfaces due to axial loading applied thereto by the followers. The angles Q,S are normally selected whereby the cam surfaces 22,23 may drive the cam followers axially but mere axial movement of the cam followers cannot drive the cam surfaces. However, if desired, the angles, Q,S can be selected to provide a degree of reversibility.

As mentioned above, the adjacent cam followers may be arranged with their side surfaces 34,35 closely adjacent or in inter-engagement. Driving force F applied to any follower 28 in non-driving engagement with cam surfaces may be arranged to transmit driving load applied thereto to the next driving follower through the interengaging surfaces. Also the use of interengaging surfaces further inhibits the cam followers tipping relative to the cams.

Interengagement of the surface will take place over substantially their entire length. The torque ratio requirement between the two net torques of the inside and outside output shafts is higher in some application than others. Where high torque differentials are required say from 3:1 to 5:1 this can cause problems with wear rates between the cam followers and the cam surfaces.

By increasing the frictional engagement between one of the cam output members 16,17 and the input element the torque ratio for a given differential can be increased. Further, by selecting the cam surface 23 which has the higher number of pairs of inclined surfaces 26,27 then the mean torque difference can be increased and the spread in torque difference between right and left hand turns can be decreased up to a particular level of friction engagement.

Beyond that point, any increase in frictional engagement might cause the torque spread to go into reverse, with say the maximum ratio shifting from the left hand turn to a right hand turn and the spread thereafter increasing.

A thrust washer 51, or needle bearing, is located between the output cam member 17 and the end wall 14 and can be supported on, if necessary; shims 52 for setting the required axial position of the cam surface 23.

Axial thrust applied to the cams 16,17 by the followers 28 is transmitted to the end wall 14 through the thrust washer 51 and to the end wall 13 by thrust needle bearings 53. Again shims 52 may be used to adjust the relative axial positions of the cams. A belleville washer 54 (shown compressed into a flat configuration in FIG. 1) may be arranged to act against a bearing washer 55 to urge the followers 28 into firm engagement with the cam surfaces 22,23. The urging of the followers against the cam surfaces also creates a radially outward force Z on the followers 28 resulting from the angles of inclination P and P2 in addition helps to reduce backlash.

In FIG. 1 it can be seen that the angles of inclination to the axis X—X of the undulating cam surfaces 22,23 are different, the undulating cam surface 22 being inclined at angle P and the undulating cam surface 23 being inclined at angle P2. The cam followers 28 have similarly inclined end surfaces 29,30 and 32,33. The end surfaces 29,30 are also mutually inclined at the same angle as helical surfaces 24,25 and end surfaces 32,33 are inclined at the same angle as helical surfaces 26,27.

As the angle of inclination between the surfaces 24,25 is different from that between surfaces 26,27 the division of torque between the output shafts splined to the output cams 16 and 17 will be different when the cams are turning relative to each other in one direction than when they are turning relatively in the opposite direction. It has been found that appropriate selection of angles P and P2 can affect the ratio of torques transmitted to the shafts. The ends of the cam follower 28, being inclined at different angles P and P2, also aids the correct assembly of the differential.

In some applications it may be desirable to lock up the differential. One method of locking is shown in FIGS. 1 and 5 in which a pin 60 is mounted in the end wall 14 and is axially slidable therein. The pin has a head 61 which is engageable with a snail cam 62 pivoted externally on the housing 11. The snail can 62 is operated by a sliding collar 63 to push the pin 60 against a cam follower 28 to limit travel of follower and hence lock up the differential. The said snail cam surface is sufficiently shallow to prevent cam follower end loads from forcing the pin back, or alternatively the said snail cam surface could go over centre.

The collar 63 could operate more than one pin through a number of similar snail cam devices.

Pin travel should preferably be 25%–75% of the full axial travel of the follower 28 to give adequate contact area on the follower cam surface near the mid stroke position of the follower. Where more than one pin is used then the pin travel may have to be reduced to less than 50% to ensure that all the affected followers can reach the same position together.

With reference to FIG. 6, the collar 63 is moved axially by a fork/lever system 70 mounted by pivot pin 101 on the differential casing 100. The fork is operated by a fluid actuator 72 and on cessation of the operation of the actuator 72 the lever is returned to its position by a return spring 73. A warning device 74 is operated by the fork to indicate when the lock is engaged.

With reference to FIG. 7, there is shown an alternative lock means comprising a collar 83 splined onto an output shaft 84 from an output cam 16 or 17. The collar 83 has dog teeth 85 thereon that can engage external teeth 86 that surround the bore 18 in the end wall of the housing 11.

The actuation is as described above for FIG. 6. In this case the relative rotation of one output member and input is prevented directly by engagement of the collar teeth with the teeth on the end wall of the housing.

Whilst the invention has been described with reference to a differential as illustrated in FIG. 1, it is applicable to a differential as described in our copending application 92 23406.1 the content of which is hereby incorporated.

I claim:

1. A differential mechanism comprising: two output cam members rotatable about and axis (X—X), each said memeber having a single annular frustoconical cam surface thereon of undulating form comprising pairs of mutually inclined surfaces and a plurality of cam followers having end surfaces engaging the cam surfaces of the output cam members, the arrangement being such that relative contra rotation of said output cam members causes the cam followers to slide axially, an input member engaging the followers which are slidably supported by the input member and moving the followers circumferenctially relative to the output cam members, and locking means mounted on the input member and arranged to engage a cam follower to prevent axial movement of said cam follower and hence relative rotational movement of the output cam members to lock up the differential mechanism.

2. A differential mechanism as claimed in claim 1 in which the locking means comprise a pin slidably mounted in the input member.

3. A differential mechanism as claimed in claim 2 in which the pin engages a cam surface on a lever pivoted relative to the input housing the lever being engaged by an axially movable operating ring arranged coaxially of the input housing.

4. A differential mechanism as claimed in claim 1 in the cam surfaces are frustoconical and converge towards each other, and input element engages a radially outer portion of each cam follower and supports the two cam output members against axially outward movement during drive of the cam output members through the cam followers.

5. A differential mechanism as claimed in claim 1 characterised in which the locking means is operated by a fluid pressure actuator.

* * * * *